United States Patent [19]
Saito et al.

[11] Patent Number: 5,818,813
[45] Date of Patent: Oct. 6, 1998

[54] ORTHOGONAL FREQUENCY DIVISION MULTIPLEXING TRANSMISSION SYSTEM AND TRANSMITTER AND RECEIVER ADAPTED TO THE SAME

[75] Inventors: Masafumi Saito, Tokyo; Tetsuomi Ikeda, Machida, both of Japan

[73] Assignee: Advanced Digital Television Broadcasting Laboratory, Tokyo, Japan

[21] Appl. No.: 707,077

[22] Filed: Sep. 3, 1996

[30] Foreign Application Priority Data

Sep. 6, 1995 [JP] Japan .................................... 7-229107
Mar. 25, 1996 [JP] Japan .................................... 8-068768

[51] Int. Cl.⁶ ...................................................... H04J 11/00
[52] U.S. Cl. .......................... 370/208; 370/344; 370/480; 375/260
[58] Field of Search .................................... 370/203, 206, 370/207, 208, 210, 465, 480, 503; 375/260

[56] References Cited

U.S. PATENT DOCUMENTS

| 5,282,222 | 1/1994 | Fatlouche et al. .......................... 575/1 |
| 5,596,582 | 1/1997 | Sato et al. ................................ 370/509 |
| 5,608,764 | 3/1997 | Sugita et al. ............................. 375/344 |

FOREIGN PATENT DOCUMENTS

4501348  3/1992  Japan.

*Primary Examiner*—Hassan Kizou
*Assistant Examiner*—A. Bnimoussa
*Attorney, Agent, or Firm*—John P. White; Cooper & Duham LLP

[57] ABSTRACT

Data sequences correspond to L different parameter sets (effective symbol length, guard interval length, the number of carrier waves) and transformed into parallel data by respective serial/parallel converters, which are allocated to respective carrier waves for OFDM and subjected to inverse discrete Fourier transform by inverse discrete Fourier transformers to produce sampled values for the transmission waveform in the time domain. The sampled values are transformed into serial sequences of sampled values by parallel/serial converters and then into a single temporal sampling sequence by a temporal sampling sequence switching unit. A frame synchronizing symbol is added to the temporal sampling sequence and then transformed into an analog base band OFDM signal before it is converted up to a transmission signal. The frequency bandwidth of the OFDM signal is made smaller than a predetermined value defined by the bandwidth of the available transmission channel. As a result, an OFDM signal that can be received well regardless of the mode of reception can be transmitted.

10 Claims, 9 Drawing Sheets

ORTHOGONAL FREQUENCY DIVISION MULTIPLEXING TRANSMISSION SYSTEM AND TRANSMITTER AND RECEIVER ADAPTED TO THE SAME

BACKGROUND OF THE INVENTION

1. Field of the Invention

This invention generally relates to a transmission system for digital broadcasting and, more particularly, it relates to a data transmission system using orthogonal frequency division multiplexing (hereinafter referred to as OFDM) and digital modulation/demodulation. The present invention also relates to a transmitter and a receiver adapted to such a system.

2. Description of the Related Art

The demand for digitized television broadcasting using ground waves has been increasing to improve the quality of television service. The OFDM transmission system appears to be particularly promising for ground wave digital signal transmission because it is robust against the multipath effect (or the ghost effect for television).

Figure 1:
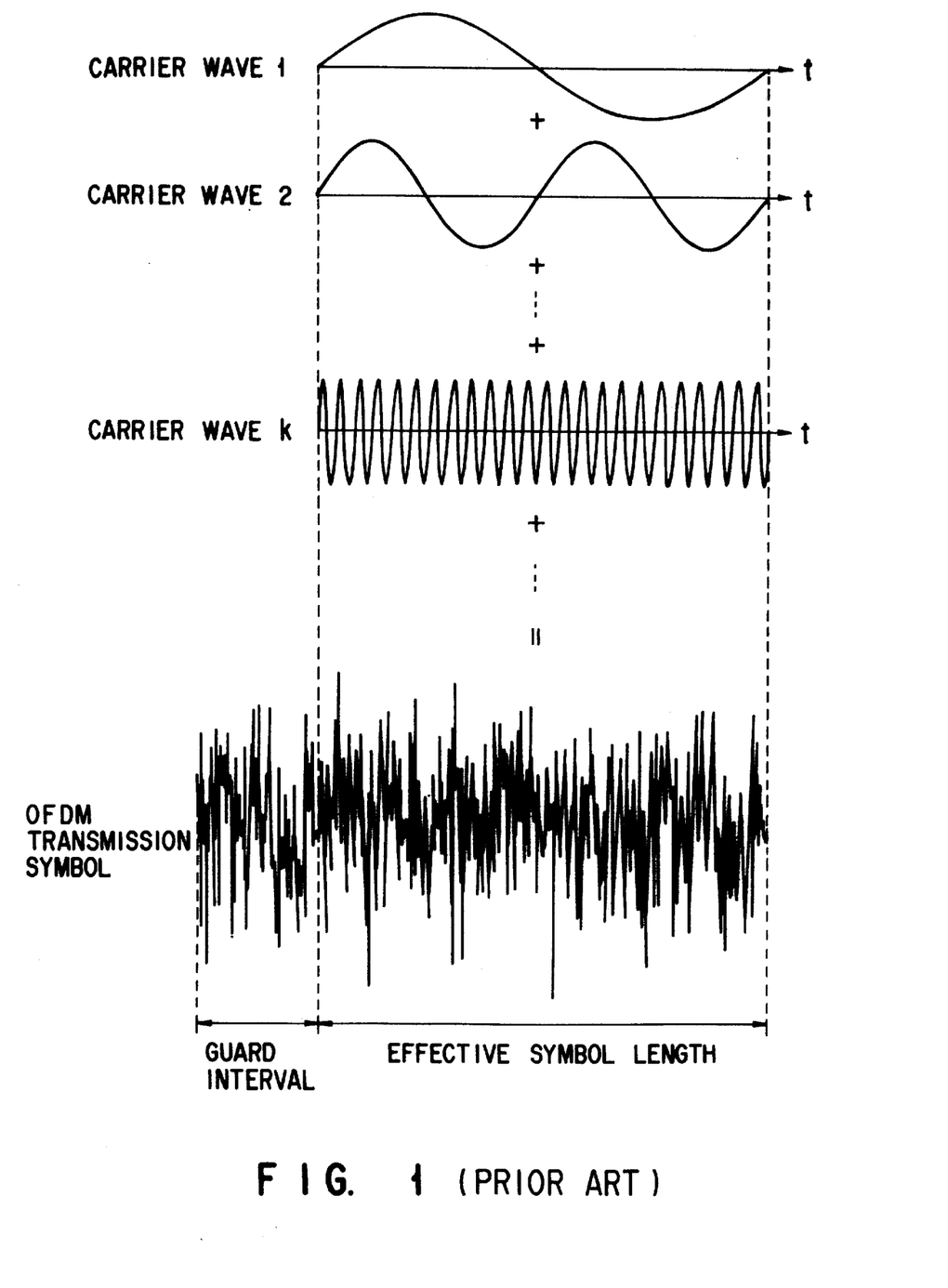
FIG. 1 is a graph schematically showing signal transmission waveforms and a transmission symbol used for the OFDM transmission system.

The OFDM transmission system is a variation of the multiple carrier modulation system, with which a transmission signal is produced by combining a large number (tens to thousands) of digitally modulated waves (carrier waves 1 through k) as typically illustrated in FIG. 1. Each of the carrier waves may be modulated in a mode selected from a number of different possible modes including QPSK, 16QAM and 64QAM.

The data transmission using the OFDM transmission system is realized by using transmission symbols as illustrated in FIG. 1, each of which constitutes a unit. Each transmission symbol comprises an effective symbol period and a guard interval. The effective symbol period is a signal period essential to data transmission. The guard interval is a redundant signal period designed to reduce the multipath effect by cyclically repeating the signal waveform of the effective symbol period.

Figures 2A, 2B:
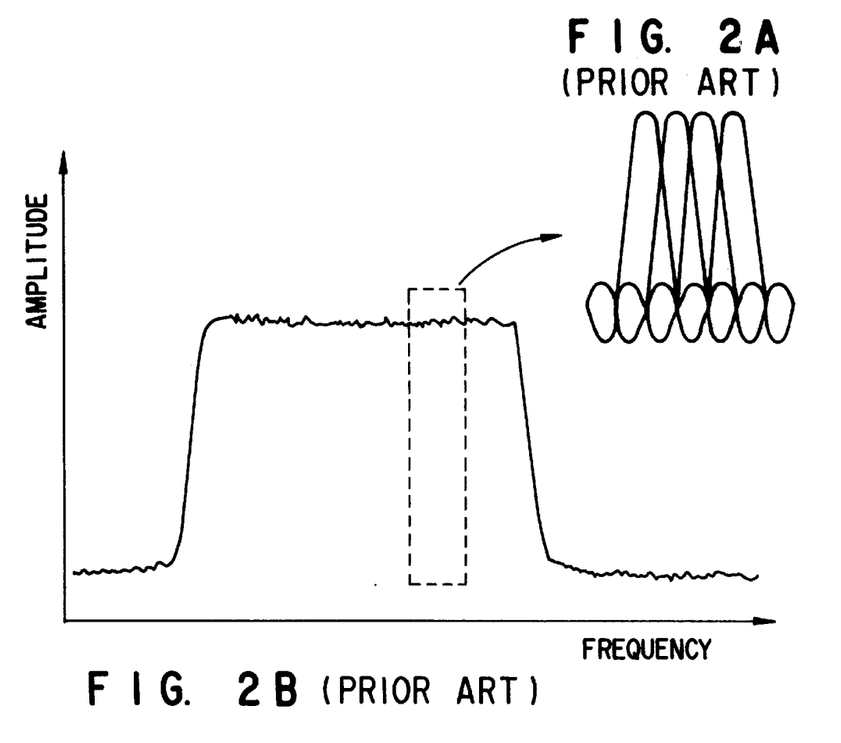
FIGS. 2A and 2B are graphs schematically showing the frequency spectrum of the OFDM transmission system.

If the gap between any two adjacent frequencies is made equal to the reciprocal number of the effective symbol period for OFDM transmission, the nil point of the frequency spectrum of each digitally modulated wave coincides with the center frequency of the adjacent modulated waves as shown in FIG. 2A so that no cross interference occurs between them. As seen from FIG. 2B, the spectrum of an OFDM signal shows a substantially rectangular profile as a whole. If the effective symbol period is ts and the number of carrier waves is K, then the frequency gap between any adjacent carrier waves is equal to 1/ts while the transmission bandwidth is equal to K/ts.

Figure 3:
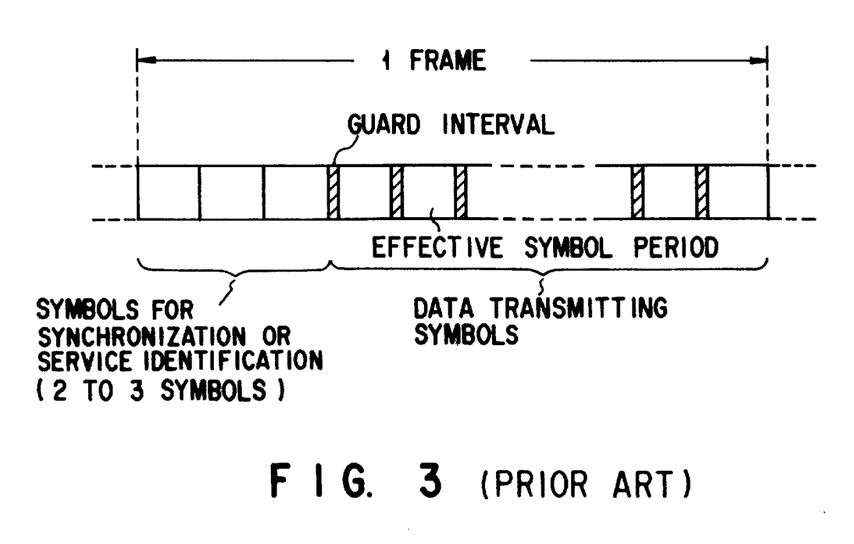
FIG. 3 is a graph schematically illustrating the configuration of a transmission frame of the OFDM transmission system.

With the OFDM transmission system, a transmission frame is comprised of tens to hundreds of transmission symbols as shown in FIG. 1. FIG. 3 illustrates a typical OFDM transmission frame. The OFDM transmission frame contains frame synchronizing symbols, if necessary, along with data transmitting symbols. If necessary, it may additionally contain service identifying symbols.

Figure 4:
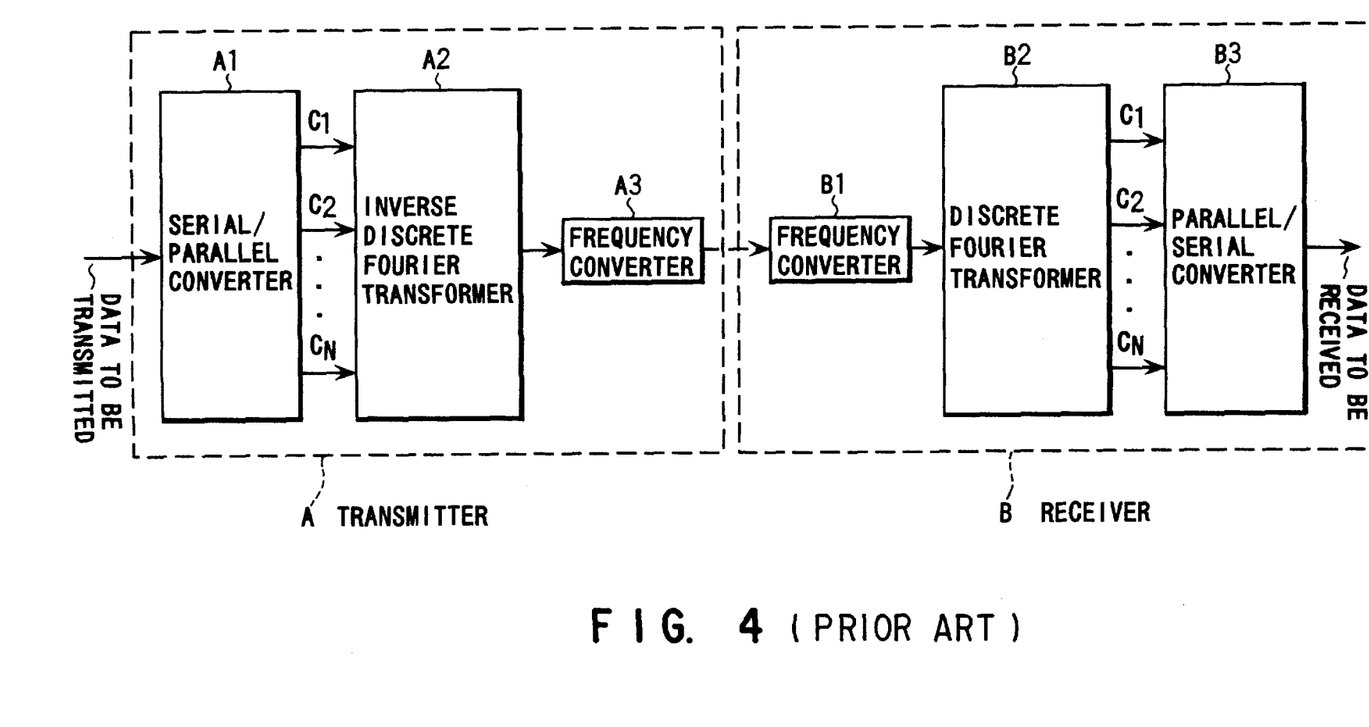
FIG. 4 is a schematic block circuit diagram of a transmitter and a receiver adapted to a known OFDM transmission system.

FIG. 4 illustrates the concept of a transmitter A and a receiver B adapted to the OFDM transmission system.

The transmitter A divides a binary data to be transmitted into data blocks, each of which has a predetermined number of bits and is converted into a complex number prior to transmission. Serial/parallel converter A1 allocates different complex numbers Ci (i=1 to N) to the carrier wave frequencies on a one by one basis and inverse discrete Fourier transform circuit A2 carries out an operation of inverse discrete Fourier transform to the time domain. As a result, sampled data are produced for a time base waveform so that a base band analog signal having a temporally continuous waveform is obtained from the sampled data and processed for frequency conversion by frequency converter A3 before it is transmitted.

The number of sampled values produced on a time base by inverse discrete Fourier transform is typically $2^n$ for each effective symbol period (n being a positive integer). Thus, if $r_G$ is defined as $r_G$=(guard interval length)/(effective symbol length), then $2^n \cdot (1+r_G)$ samples are produced for each transmission symbol. The length of each transmission symbol is usually equal to the time interval of sampling points multiplied by an integer.

On the part of the receiver B, frequency converter B1 processes the received signal for frequency conversion to obtain a base band signal waveform, which is sampled at a sampling rate same as that of the transmitter. Discrete Fourier transform circuit B2 processes the sampled data to carry out an operation of discrete Fourier transform to the frequency domain and obtains by calculation the phase and the amplitude of each of the carrier wave frequency components to determine the value of each of the received data before they are converted into serial data by parallel/serial converter B3 and produced as data output.

While television signals are received either in the fixed mode or in the mobile mode (including the portable reception mode), a good reception is essential regardless of the mode of reception. With any known OFDM system, the effective symbol length, the guard interval length and the number of carrier waves of data transmitting symbols are determined mainly on the basis of either the fixed reception mode or the mobile reception mode. If the effective symbol length, the guard interval length and the number of carrier waves of data transmitting symbols are based mainly on, for example, the fixed reception mode, not the mobile reception mode, the influence of fading will be serious.

SUMMARY OF THE INVENTION

As pointed out above, with any known OFDM transmission system, the effective symbol length, the guard interval length and the number of carrier waves of data transmitting symbols are determined on the basis of the most popular reception mode because they cannot be selected so as to adapt themselves to more than one different modes.

It is, therefore, the object of the present invention to provide an OFDM transmission system that ensures a good signal reception regardless of the selected reception mode and a transmitter and a receiver adapted to such a system.

According to the invention, the above object is achieved by providing an OFDM transmission system for transmitting data by means of OFDM and digital modulation/demodulation, characterized in that, if the time interval of OFDM sampling points is T, the effective symbol length NiT (Ni being a positive integer), the guard interval length MiT (Mi being zero or a positive integer) and the number of carrier waves Ki (Ki being a positive integer) of the i-th data transmission symbol in an OFDM transmission frame can take a plurality of respectively different values that can be arbitrarily selected, provided that Ki/NiT is kept smaller than a constant value W (W being a positive real number) determined by the bandwidth of the transmission channel.

In other words, with the OFDM transmission system according to the invention, two or more than two values are used for the effective symbol length and also for the guard interval length of a data transmission symbol and the symbol length is made equal to the sampling period, which is a basic unit for OFDM digital signal processing, multiplied by an integer. Additionally, the frequency bandwidth of OFDM transmission signal is made smaller than a constant value determined by the bandwidth of the transmission channel.

As a result, no cross interference appears if a plurality of data transmitting symbols having respective effective symbol lengths and guard interval lengths that are different from each other are multiplexed in a single transmission channel. Thus, the OFDM transmission system according to the invention can meet different conditions for data transmission in a single transmission channel without reducing the efficiency of the use of frequencies and entailing any cross interference among carrier waves.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 11A and 11B show two alternative arrangements of carrier waves for shifting the frequency of each of the carrier waves within a base band in order to change the frequency at predetermined periods, of which FIG. 11A is designed for symbols for mobile reception whereas FIG. 11B is designed for symbols for fixed reception.

DETAILED DESCRIPTION OF THE PREFERRED EMBODIMENTS

Figure 5:
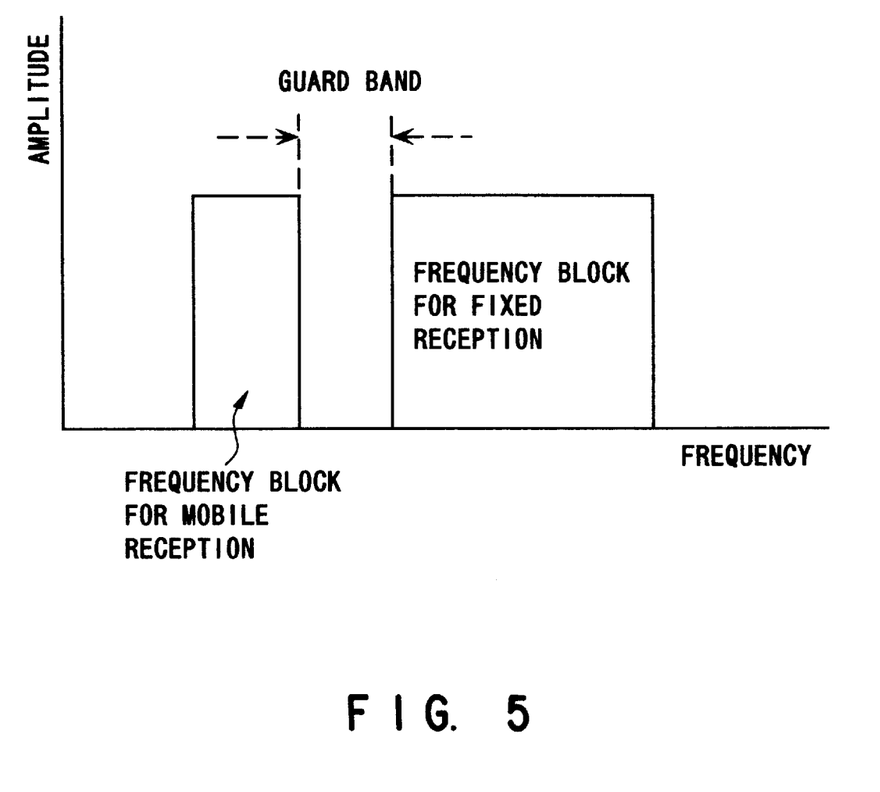
FIG. 5 is a graph showing the frequency spectrum of an OFDM transmission system having a frequency block for the fixed reception mode and a frequency block for the mobile reception mode in a transmission channel.

The idea underlying the present invention will firstly be described. OFDM transmission symbols adapted to fixed reception and those adapted to mobile reception may be transmitted through a single transmission channel by dividing each OFDM signal into two frequency blocks on a frequency base, which frequency blocks are separated by a guard band in order to prevent interference from taking place among carrier waves, and selecting different values for the symbol length in these frequency blocks, which are respectively used for the fixed and mobile reception modes as shown in FIG. 5.

However, with the above method of dividing an OFDM signal into a plurality of blocks, the carrier waves which belong to different frequency blocks can not have an orthogonal relationship because the effective symbol length and the carrier wave frequency gap are differentiated from a frequency block to another, therefore, a guard band has to be provided between any adjacent frequency blocks at the cost of reducing the efficiency of the use of frequencies and the transmission bit rate of a transmission channel.

According to the invention, data transmitting symbols adapted to fixed reception and those adapted to mobile reception can be transmitted through a single transmission channel without providing one or more than one guard bands to prevent cross interference from occurring among carrier waves and hence without reducing the efficiency of the use of frequencies.

With OFDM transmission systems, an FFT window having the same length as that of the effective symbol period is provided in each data transmitting symbol period and 2n sampling points are subjected to an operation of discrete Fourier transform to the frequency domain in the demodulator.

The FFT window is arranged usually at the rear end of each transmission symbol. Note that no ghost can get into the FFT window in the demodulator from the adjacent symbol if the multipath delay time (or the ghost signal delay time for television) is shorter than the guard interval length. Therefore, the degradation due to the multipath phenomenon can be made far less serious than the degradation in a single carrier arrangement. Thus, with OFDM transmission systems, the influence of a ghost having a long delay time can be prevented by selecting a long guard interval to make the system substantially unaffected by the multipath phenomenon.

Now, an OFDM symbol length and a guard interval length adapted to fixed reception and those adapted to mobile reception will be discussed below.

Generally, the influence of multipath is one of the most important technological problems that have to be dealt with to achieve a good fixed reception for the OFDM system. As pointed out above, the use of a long guard interval is a useful technique for the prevention of the influence of ghost signals.

However, since the guard interval adversely affects the transmission capacity (bit rate) of a symbol in a manner as described above and the use of a long guard interval reduces the bit rate of a symbol having a given length, the effective symbol length has to be made proportional to the guard interval length and, therefore, a symbol having a long length has to be used to maintain a desired level of bit rate.

For the mobile reception mode, on the other hand, the characteristics of the transmission channel can change with time due to the fading phenomenon and, therefore, the use of a long OFDM symbol can result in an unnegligible change in the characteristics of the transmission channel within the time required for the transmission of a single symbol and hence a large bit error rate appears if the OFDM symbol length is too long. In other words, a long guard interval and hence a long symbol length operate disadvantageously for the fading phenomenon that can be observed in mobile reception. It may be safe to say that the portable reception mode is a combination of the fixed and mobile reception modes.

As discussed above, for the OFDM transmission system, the optimal values of the guard interval length, the effective symbol length and other transmission parameters may vary depending on the mode of reception. Therefore, a single set of values probably cannot optimize the reception in both the fixed and mobile reception modes. Thus, the OFDM transmission system according to the invention will be particularly useful when transmitting data through a single transmission channel for both the fixed and mobile reception modes, while using long symbols in the fixed reception mode.

Now, an embodiment of a transmitter and that of a receiver adapted to the OFDM transmission system according to the invention will be described in detail by referring to FIGS. 6 and 7.

Figure 6:
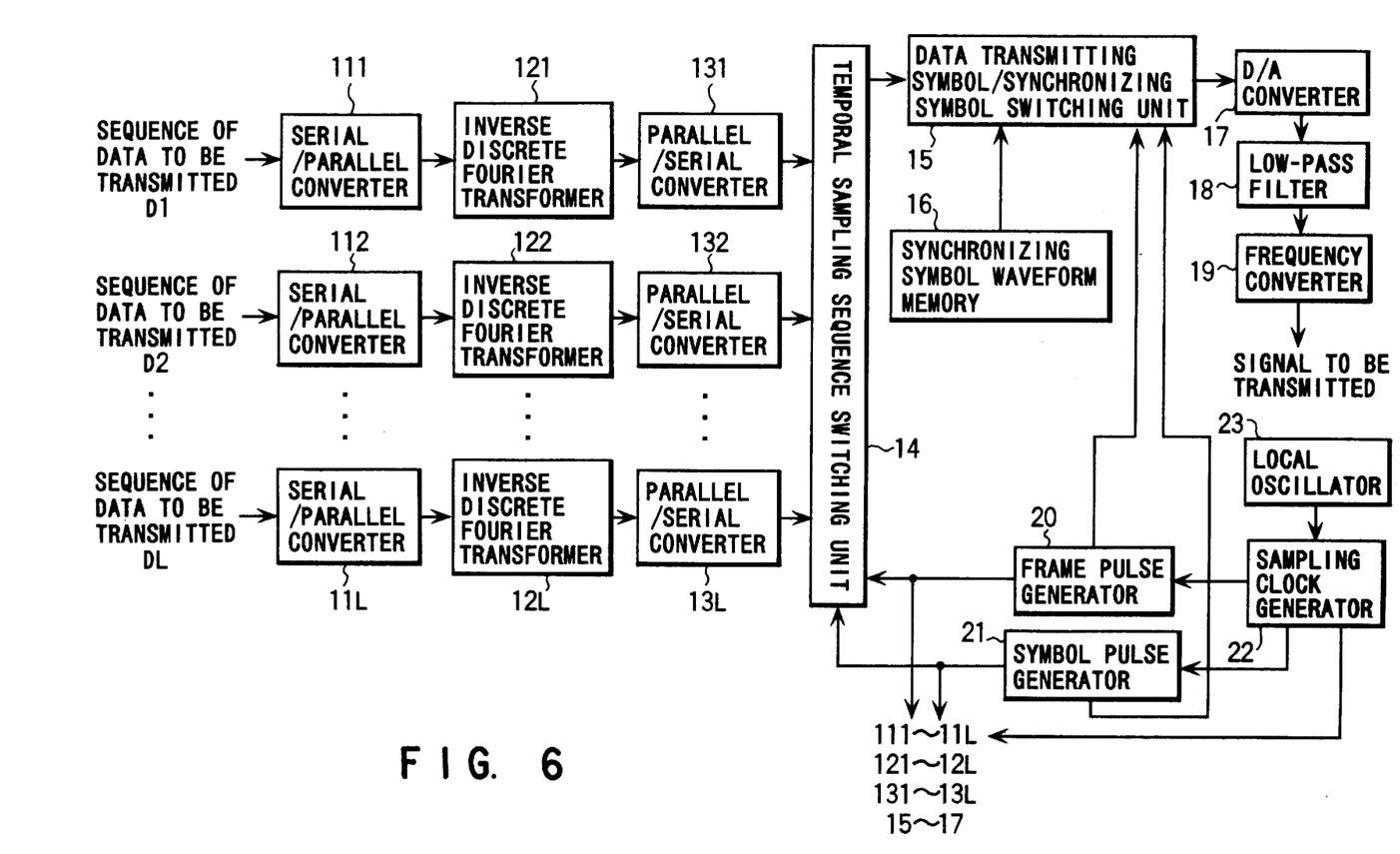
FIG. 6 is a schematic block circuit diagram of an embodiment of a transmitter adapted to the OFDM transmission system of the invention.

FIG. 6 is a schematic block circuit diagram of an embodiment of a transmitter adapted to the OFDM transmission system of the invention. The transmitter comprises serial/parallel converters 11­1 through 11­L, inverse discrete Fourier transformers 12­1 through 12­L, parallel/serial converters 13­1 through 13­L, a temporal sampling sequence switching unit 14, a data transmitting symbol/synchronizing symbol switching unit 15, a synchronizing symbol waveform memory 16, a D/A converter 17, a low-pass filter 18, a frequency converter 19, a frame pulse generator 20, a symbol pulse generator 21, a sampling clock generator 22 and a local oscillator 23.

A total of L sequential data D1 through DL to be transmitted are applied respectively to the L serial/parallel converters 11­1 through 11­L. A set of L parameters (effective symbol length, guard interval length, number of carrier waves) are provided to correspond to the L sequential data D1 through DL to be transmitted.

Said serial/parallel converters 11­1 through 11­L convert respective serial data into parallel data, which are allocated respectively to the carrier waves of the OFDM transmission system. The inverse discrete Fourier transformers 12­1 through 12­L determines the phases and the amplitudes of the respective carrier waves on the basis of the data allocated for transmission. The phase and the amplitude of each of the carrier waves are treated as a complex number in the frequency domain and subjected to an operation of inverse discrete Fourier transform and the sampled values of the transmission waveform obtained in the time domain are produced as outputs. Then, the parallel/serial converters 13­1 through 13­L convert the temporally sampled values produced in parallel into a sequence of serially sampled values for each symbol.

On the other hand, the sampling clock generator 22 generates a sampling clock on the basis of the original oscillation frequency signal produced by the local oscillator 23. The frame pulse generator 20 and the symbol pulse generator 21 respectively generate a frame pulse and a symbol pulse from the sampling clock. The sampling clock, the frame pulse and the symbol pulse are fed to the components of the transmitter for timing purposes.

The temporal sampling sequence switching unit 14 selectively switches the L sequences of temporal samples to transform them into a single sequence of temporal samples by using the frame pulse and the symbol pulse. The synchronizing symbol waveform memory 16 produces the sampled values of the frame synchronizing symbol waveform. The data transmitting symbol/synchronizing symbol switching unit 15 switches the sequence of temporally sampled values of the data transmitting symbol produced by the temporal sampling sequence switching unit 14 and the sequence of sampled values of the waveform of the frame synchronizing symbol produced by the synchronizing symbol waveform memory 16 to transform them into a sequence of temporally sampled values of the base band OFDM signal.

The D/A converter 17 converts the sequence of temporally sampled values into an analog signal and the low-pass filter 18 eliminates the high frequency components of the analog signal to produce an analog base band OFDM signal. The frequency converter 19 converts the frequency of the base band OFDM signal up to an intermediate frequency or a radio frequency and produces a signal to be transmitted.

Figure 7:
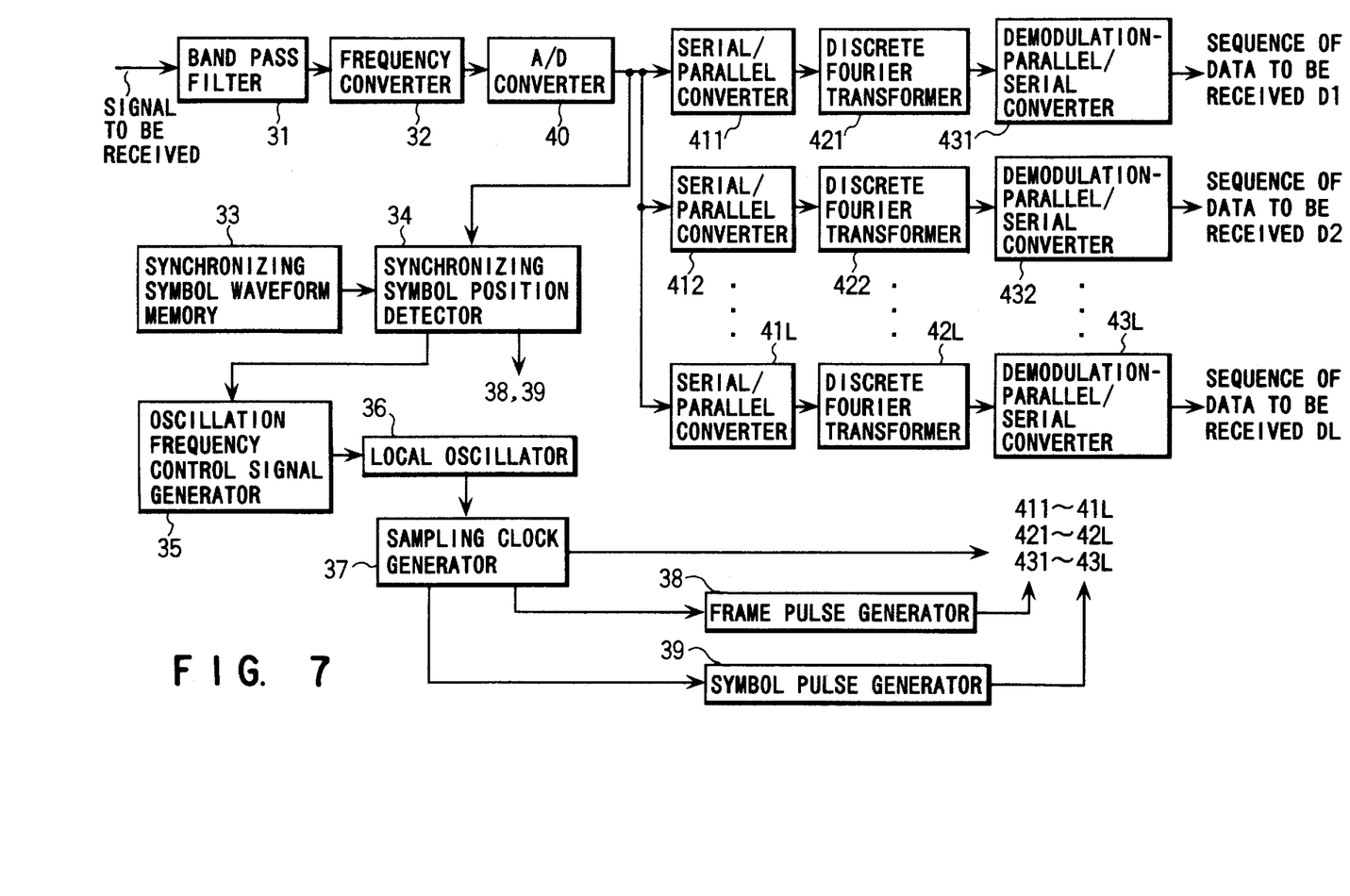
FIG. 7 is a schematic block circuit diagram of an embodiment of a receiver adapted to the OFDM transmission system of the invention.

FIG. 7 is a schematic block circuit diagram of an embodiment of a receiver adapted to the OFDM transmission system of the invention. It comprises a band-pass filter 31, a frequency converter 32, a synchronizing symbol waveform memory 33, a synchronizing symbol position detector 34, an oscillation frequency control signal generator 35, a local oscillator 36, a sampling clock generator 37, a frame pulse generator 38, a symbol pulse generator 39, an A/D converter 40, serial/parallel converters 41­1 through 41­L, discrete Fourier transformers 42­1 through 42­L and demodulation-parallel/serial converters 43­1 through 43­L.

In the receiver having the configuration described above, the band-pass filter 31 eliminates the out-of-band components and the frequency converter 32 converts the intermediate frequency or the radio frequency of the OFDM signal down to a base band. The A/D converter 40 transforms the base band OFDM signal into a sequence of sampled digital values, which are respectively fed to the serial/parallel converter 41­1 through 41­L and also to the synchronizing symbol position detector 34.

The synchronizing symbol position detector 34 detects the position of the front end of the frame by calculating the correlated values of the sequence of sampled values of the base band OFDM signal and the sequence of sampled values of the synchronizing symbol waveform stored in the synchronizing symbol waveform memory 33. It also determines the position for switching the transmitting symbols and the position of the FFT window.

The oscillation frequency control signal generator 35 generates a signal for controlling the oscillation frequency of the local oscillator 36 on the basis of the frame period detected by the synchronizing symbol position detector 34. A method of controlling the local oscillation frequency by means of a frame period is described in Japanese Patent Application No. 6-138386 "Clock frequency automatic control method and transmitter and receiver using the same".

The sampling clock generator 37 generates a sampling clock on the basis of the original oscillation frequency signal produced by the local oscillator 36. The frame pulse generator 38 and the symbol pulse generator 39 respectively generate a frame pulse and a symbol pulse on the basis of the data on the position of the front end of the frame produced by the synchronizing symbol position detector 34 and the sampling clock. The sampling clock, the frame pulse and the symbol pulse are respectively fed to the related components of the receiver and used to generate various timing signals.

The serial/parallel converter 411 through 41L transform the sequence of sampled base band values into parallel data, which are fed then to the discrete Fourier transformers 421 through 42L. The discrete Fourier transformers 421 through 42L transform the sampled values in the time domain into spectra for the respective carrier wave frequencies. The demodulation-parallel/serial converters 431 through 43L estimate the phases and the amplitudes of the carrier waves from the respective frequency component, determines the values of the received data on the basis of the phases and the amplitudes and transform them into sequences of serial received data D1 through DL, which are then produced by the converters as respective outputs. The L sequences of received data D1 through DL corresponds to the L parameter sets.

In the transmission system having the configuration described above, the inverse discrete Fourier transformer 12i (i being an integer between 1 and L) and the discrete Fourier transformer 42i (i being an integer between 1 and L) arbitrarily select Ni, Mi and Ki provided that Ki/NiT is kept smaller than a constant value W (W being a positive real number) determined by the bandwidth of the transmission channel, where T is the time interval of sampling clocks, NiT is the effective symbol length (Ni being a positive integer), MiT is the guard interval length (Mi being zero or a positive integer) and Ki is the number of carrier waves (Ki being a positive integer).

The temporal sampling sequence switching unit 14 switches the data transmitting symbols in such an order that the data transmitting symbols having an identical effective symbol length and a guard interval length are continuously arranged on the time base and the number of switching points where two adjacent data transmitting symbols having at least mutually different effective symbol lengths or mutually different guard interval lengths are located is minimized.

Figure 8:
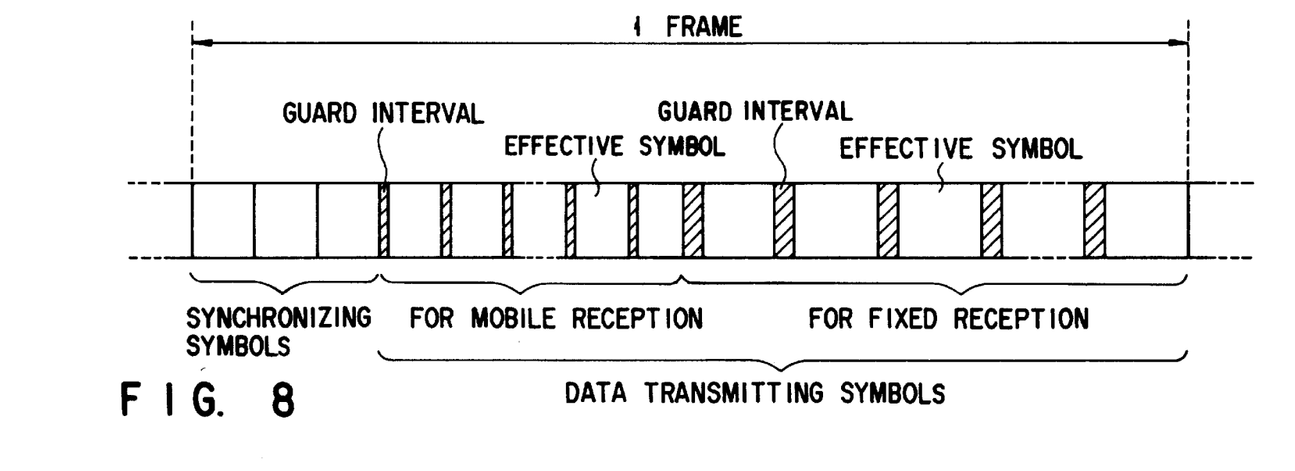
FIG. 8 is a graph schematically illustrating the configuration of a transmission frame of the OFDM transmission system according to the invention.
Figure 9:
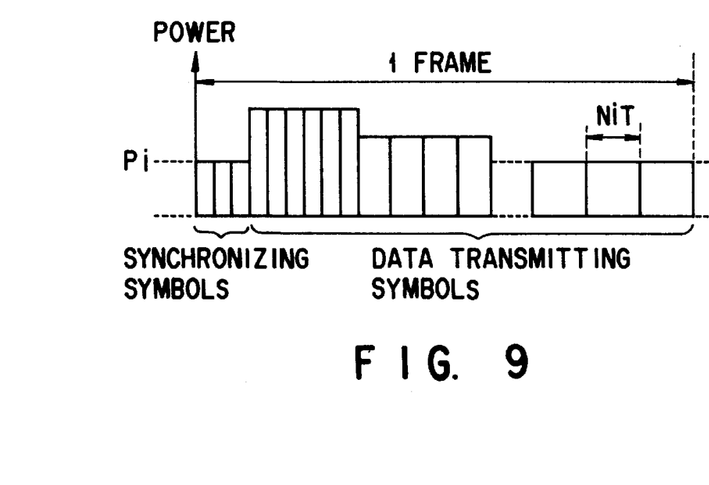
FIG. 9 is a graph schematically illustrating the relationship between the effective symbol length of an OFDM transmission symbol and the average transmission power level that can be used for another embodiment of the invention.

While there may be a number of different orders according to which symbols corresponding to data sequences D1 through DL are transmitted, data transmitting symbols corresponding to a sequence of data (a set of parameters) are to be most basically transmitted in an continuous order on the time base. Then, the number of switching points where two adjacent data transmitting symbols having respective sets of parameters that are different from each other are located is minimized. FIG. 8 shows a typical arrangement of data transmitting symbols that meets the above requirements.

Assuming L=2 and that sequence D1 of transmission data is for the fixed reception mode and sequence D2 of transmission data is for the mobile reception mode, a good data reception can be realized in either mode by selecting respective sets of parameters for fixed reception and mobile reception for the inverse discrete Fourier transformers 121 and 122.

Thus, with the OFDM transmission system according to the invention, any cross interference can be prevented from appearing between two adjacent carrier waves without using a guard band so that various different requirements of transmission can be met within a single transmission channel without reducing the efficiency of the use of frequencies. Specifically, OFDM data transmitting symbols good for fixed reception and those adapted to mobile reception can be transmitted through a single transmission channel without reducing the efficiency of the use of frequencies.

While L inverse discrete Fourier transformers 121 through 12L are used for L different parameter sets in the arrangement of FIG. 6, a single inverse discrete Fourier transformer may cover L different symbol lengths if it is adapted to the use of a plurality of FFT points.

While the technique of modulation to be used for the OFDM carrier waves may be selected depending on the phase and the amplitude assigned to each carrier wave in the form of a complex number in the frequency domain, different techniques of modulation may be respectively used for sequences D1 through DL of transmission data, typically including techniques such as DQPSK, 16QAM and 64QAM.

Similarly, while L discrete Fourier transformers 421 through 42L are used for L different parameter sets in the arrangement of FIG. 7, a single discrete Fourier transformer may cover L different symbol lengths if it is adapted to the use of a plurality of FFT points.

Of the L data sequences D1 through DL, the sequence D1, for example, and the corresponding transmission symbols may be used to transmit data on the effective symbol lengths, the guard interval lengths, the number of carrier waves and the modulation techniques selected for the carrier waves for the remaining data sequences D2 through DL from the transmitter to the receiver.

Generally speaking, if the effective symbol length NaT (Na being a positive integer), the guard interval length MaT (Ma being zero or a positive integer) and the number of carrier waves Ka (Ka being a positive integer) of a specific data transmitting symbol in an OFDM transmission frame are known by the receiver along with the modulation techniques selected for the carrier waves of the specific symbol, the parameter sets for the data transmitting symbols can be modified by transmitting at least part of the data on the effective symbol lengths, the guard interval lengths, the number of carrier waves and the modulation techniques selected for the respective carrier waves of all the data transmitting symbols other than said specific data transmitting symbol in the frame from the transmitter to the receiver by means of said specific symbol.

If the average transmission power required for the i-th data transmitting symbol can be Pi in the OFDM frame of the above embodiment, Pi can be determined as a function of Ni that defines the effective symbol length in the frame so that Pi and Ni provide a one-to-one correspondence. If, additionally, there are L different possible values of Ni, there will also be L different possible values of Pi so that the average transmission power Pi may vary depending on the effective symbol length NiT of each data transmitting symbol.

With such an arrangement, different service areas may be provided for fixed reception and for mobile reception by selecting different values of the average transmission powers for fixed reception and for mobile reception.

If, in the above embodiment, the value of Ni is selected from A1, A2, . . . , AL and Amax is the largest value of A1, A2, . . . , AL, all the numbers A1, A2, AL may be so selected as to be divisors of Amax that can exactly divide the latter. In other words, if the effective symbol length NiT is selected from A1T, A2T, . . . , ALT and AmaxT is the largest value of A1T, A2T, . . . , ALT, they are divisors of AmaxT that can exactly divide the latter.

Then, all the data transmitting symbols can commonly share part of the carrier waves. Therefore, data on carrier phase necessary for coherent demodulation or control data can be transmitted by means of such commonly shared carrier waves.

On the other hand, if Mi that defines the guard interval length can take only a single value, that is, if there are a plurality of values that the effective symbol length NiT can take and the guard interval length MiT can take only a single value, then the layer for fixed reception and that for mobile reception in each transmission frame will perform exactly in a same manner against inter-symbol interference due to multipath.

Finally, the frequencies of the carrier waves for the data transmitting symbols in an OFDM transmission frame may be shifted with a predetermined period and a predetermined frequency interval. More specifically, the frequencies of the carrier waves of data transmission symbols having a relatively few number of carrier waves (or symbols for mobile reception) may be shifted by the frequency interval of the carrier waves of other data transmission symbols having a relatively large number of carrier waves (or symbols for fixed reception) multiplied by an integer.

With such an arrangement, data on carrier phase necessary for coherent demodulation of symbols for fixed reception or data for equalization can be transmitted by means of the carrier waves of symbols for mobile reception.

Figure 10A:
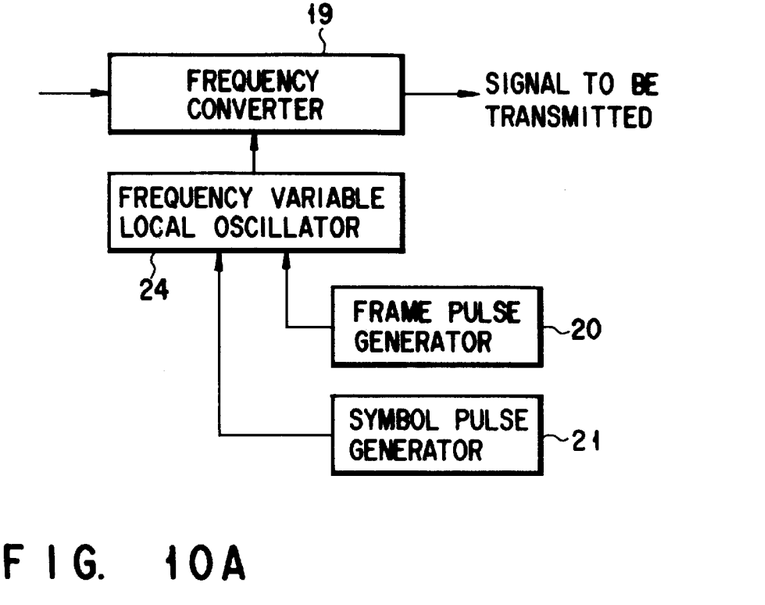
FIGS. 10A and 10B respectively show schematic block diagrams of an embodiment of a transmitter and that of a receiver according to the invention and designed to change the carrier wave frequencies at predetermined periods and a predetermined frequency gap.
Figure 10B:
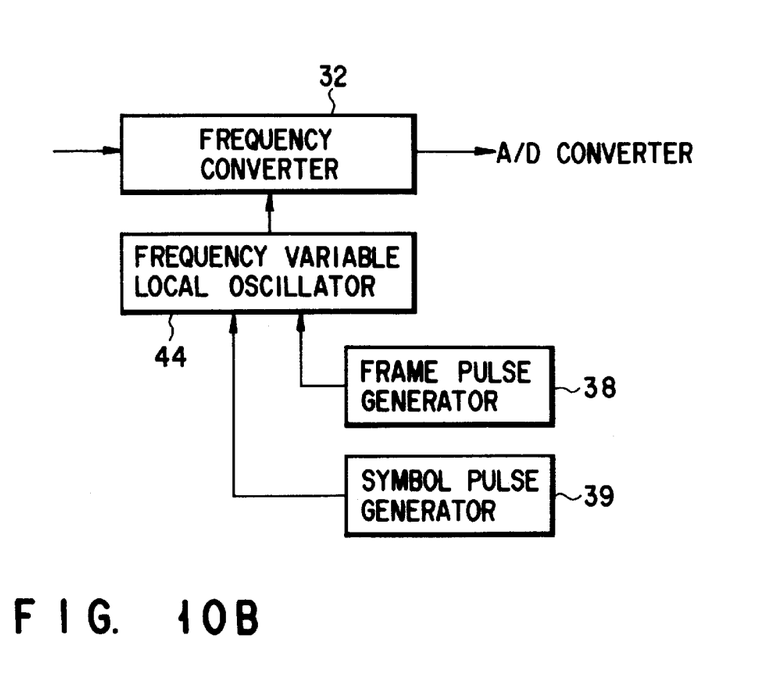
Figure 11A:
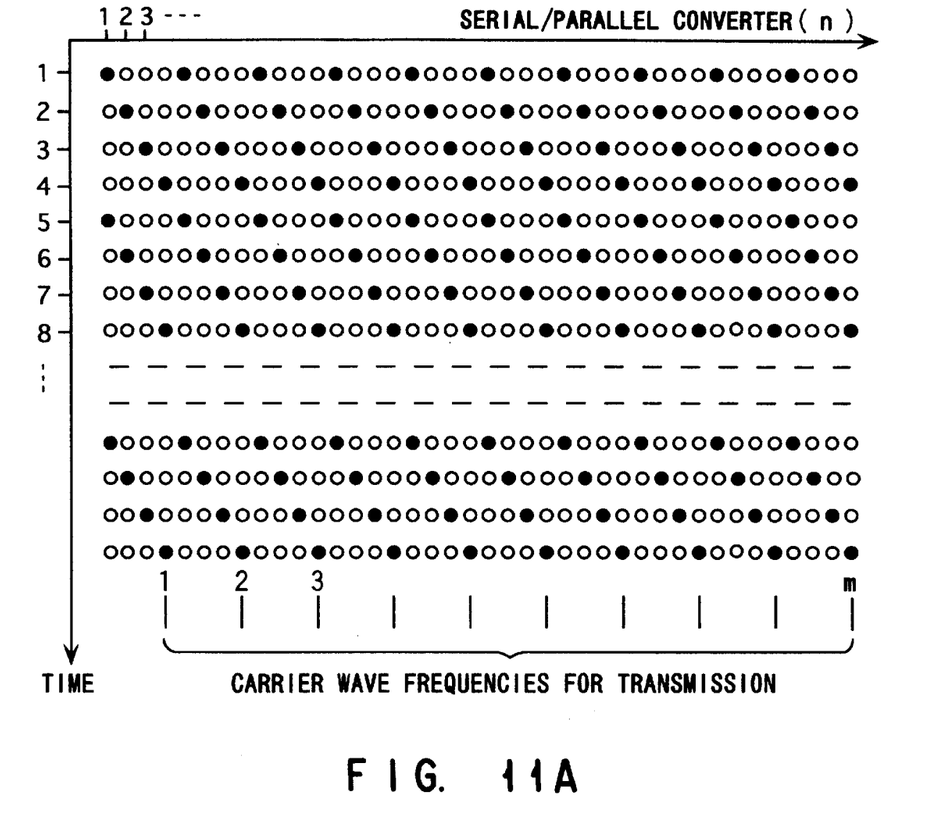
Figure 11B:
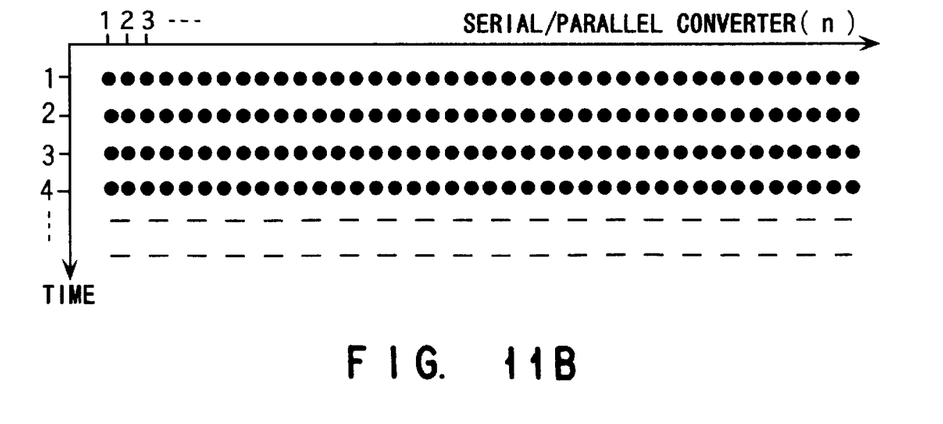

More specifically, the frequencies may be shifted in a radio frequency band or in a base band. FIGS. 10A and 10B are circuit configurations adapted to the former, whereas FIGS. 11A and 11B illustrates possible arrangements of carrier waves adapted to the latter. The components common to those of FIGS. 6 and 7 are respectively denoted by the same reference symbols.

(1) Frequency Shift in a Radio Frequency Band

FIG. 10A shows a circuit configuration of a transmitter designed for a frequency shift in a radio frequency band. Variable frequency local oscillator 24 shifts the oscillation frequency according to the transmission symbol by means of the frame pulse and the symbol pulse fed respectively from the frame pulse generator 20 and the symbol pulse generator 21 shown in FIG. 6. The frequency converter 19 shown in FIG. 6 can be driven by the shifted oscillation frequency to generate, for each data transmitting symbol, signals having frequencies shifted.

FIG. 10B shows a circuit configuration of a receiver designed for a frequency shift in a radio frequency band. Variable frequency local oscillator 44 shifts the oscillation frequency according to the transmission symbol by means of the frame pulse and the symbol pulse fed respectively from the frame pulse generator 38 and the symbol pulse generator 39 shown in FIG. 7. The frequency converter 32 shown in FIG. 7 can be driven to convert the OFDM signal having an intermediate or radio frequency down to a base band.

(2) Frequency Shift in a Base Band

FIG. 11A shows an arrangement of carrier wave frequencies of symbols for mobile reception. FIG. 11B shows an arrangement of carrier wave frequencies of symbols for fixed reception. In the example shown in FIGS. 11A and 11B, m=10 and n=40, where m is the number of carrier wave frequencies provided for the mobile-reception symbols, and n is the number of carrier wave frequencies provided for the fixed-reception symbols.

Numerals 1 to n are assigned to the carrier-wave frequencies at the input of the inverse discrete Fourier transformer provided in the transmitter. The numerals will be referred to as "frequency slot numbers." Further, numerals 1, 2, 3, . . . are assigned to the symbols for data transmission. In the symbol 1 for mobile reception, data is set to the inverse discrete Fourier transformer, in every (n/m)th slot, starting with the slot 1; in the symbol 2, data is set in every (n/m)th slot, starting with the slot 2, and so forth. The inverse discrete Fourier transformer which has n points converts the data to the time domain. A signal having frequencies shifted along the time axis as shown in FIG. 11A is thereby generated.

In the symbols for fixed reception, data are set at all n points of the inverse discrete Fourier transformer, as is illustrated in FIG. 11B. The transformer performs inverse discrete Fourier transform on the data.

On the demodulation side, too, a discrete Fourier transformer having n points is used. After the discrete Fourier transform has been performed, a symbol for mobile reception is demodulated by selecting only the frequency slots which are used in the symbol.

Figure 12:
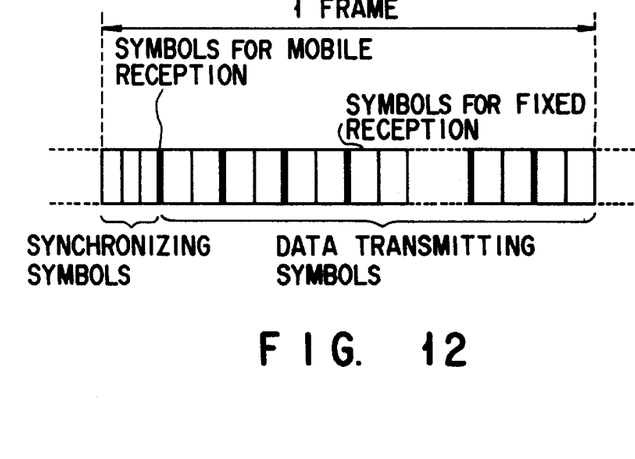
FIG. 12 is a schematic view of a transmission frame comprising one or more data transmitting symbols for mobile and fixed receivers, where symbols for mobile reception are arranged at predetermined time periods.

In the embodiment described above, one or more data transmitting symbols for mobile reception which have relatively short effective length and guard interval length may be transmitted at regular time intervals within a frame, as is illustrated in FIG. 12. The embodiment can thereby realize a time interleaving effect against fading in mobile reception. This reduces burst errors and also the memory capacity required for interleaving, than in the case where symbols for mobile reception are transmitted continuously.

The above embodiment may be used for ATM telecommunications where the amount of data to be transmitted can vary as a function of time and also for transmission of data encoded in the form of variable length codes, by modifying the transmission parameters including the effective symbol length, the guard interval length, the number of carrier waves and the modulation techniques for each carrier wave by means of a specific data transmitting symbol to modify the amount of data to be transmitted on a frame basis.

The present invention is not limited to the above embodiment, which may be subjected to various changes and modifications.

Thus, the invention provides an OFDM transmission system that ensures a good reception regardless of the mode of reception and a transmitter and a receiver adapted to such a system.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An orthogonal frequency division multiplexing (OFDM) transmission system comprising:

means for transmitting data in OFDM transmission frames defined by T, positive integers Ni and Ki, and zero or positive integer Mi, wherein T is a time interval of OFDM sampling points, NiT is an effective symbol length, MiT is a guard interval length and Ki is a number of carrier waves of an i-th data transmission symbol in said OFDM transmission frames;

means for arbitrarily selecting values for Ni, Mi and Ki means for determining a ratio Ki/NiT, wherein said ratio is smaller than a constant value W, W being a positive real number, determined by a bandwidth of a transmission channel of said OFDM transmission system; and means for ordering said data transmitting symbols for transmission so that said data transmitting symbols are transmitted in such an order that the data transmitting symbols having an identical effective symbol length and a guard interval length are continuously arranged on a time base and a number of switching points where two adjacent data transmitting symbols having at least mutually different effective symbol lengths or mutually different guard interval lengths are located is minimized.

2. An orthogonal frequency division multiplexing transmission system according to claim 1, wherein, if the average transmission power of said i-th data transmitting symbol is Pi in said OFDM transmission frame, Pi is determined as a function of Ni so that Pi and Ni provide a one-to one correspondence such that, if there are L different values Ni can take, there are also provided L different values Pi can take.

3. An orthogonal frequency division multiplexing transmission system according to claim 1, wherein, if the value of Ni is selected from a range of numbers defined by A1 to AL and Amax is the largest value of said numbers in said range, then all said numbers in said range are selected so as to be exact divisors of Amax.

4. An orthogonal frequency division multiplexing (OFDM) transmission system comprising:

means for transmitting data in OFDM transmission frames defined by T, positive integers Ni and Ki, and zero or positive integer Mi, wherein T is a time interval of OFDM sampling points, Ni is an effective symbol length, MiT is a guard interval length, and Ki is a number of carrier waves of an i-th data transmission symbol in said OFDM transmission frames;

means for arbitrarily selecting values for Ni, Mi and Ki;

means for determining a ratio Ki/NiT, wherein said ratio is smaller than a constant value W, W being a positive real number; determined by a bandwidth of a transmission channel of said OFDM transmission system; and means for ordering said data transmitting symbols for transmission such that said OFDM transmission frames include data transmitting symbols having a relatively long effective symbol length and a relatively long guard interval length for fixed reception, and said OFDM transmission frames include data transmission symbols having a relatively short effective symbol length and a relatively short guard interval length for mobile reception.

5. An orthogonal frequency division multiplexing transmission system according to claim 4, wherein said system is used for digital television broadcasting.

6. An orthogonal frequency division multiplexing transmission system according to claim 4, wherein at least one of said data transmitting symbols having a relatively short effective symbol length and a relatively short guard interval length for mobile reception are transmitted at a predetermined time interval within a transmission frame.

7. An orthogonal frequency division multiplexing (OFDM) transmission system comprising:

means for transmitting data in OFDM transmission frames defined by T, positive integers Ni and Ki, and zero or positive integer Mi, wherein T is a time interval of OFDM sampling points NiT is an effective symbol length, MiT is a guard interval length, and Ki is a number of carrier waves of an i-th data transmission symbol in said OFDM transmission frames;

means for arbitrarily selecting values of Ni, Mi and Ki;

means for determining a ratio Ki/NiT, wherein said ratio is smaller than a constant value W, W being a positive real number, determined by a bandwidth of a transmission channel of said OFDM transmission system;

means for transmitting at least part of the data of a specific data transmitting symbol in an OFDM transmission frame, where an effective symbol length NaT, Na being a positive integer, a guard interval length MaT, Ma being zero or a positive integer, and a number of carrier waves Ka, Ka being a positive integer, of said specific data transmitting symbol are known by the receiver along with modulation techniques selected for the carrier waves of said specific data transmission symbol, so that at least part of the data on the effective symbol lengths, the guard interval lengths, the number of carrier waves and the modulation techniques selected for the respective carrier waves of all the data transmitting symbols other than said specific data transmitting symbol in said specific OFDM transmission frame are transmitted from a transmitter to a receiver by said specific symbol; and means for modifying at least one of said effective symbol length, said guard interval length, said number of carrier waves and the modulation techniques for each OFDM transmission frame by a specific data transmitting symbol on an OFDM transmission frame basis.

8. A method for transmitting data in an orthogonal frequency division multiplexing (OFDM) transmission system, comprising:

transmitting at least one OFDM transmission frame defined by T, positive integers Ni and Ki, and zero or positive integer Mi, wherein T is a time interval of OFDM sampling points, NiT is an effective symbol length, MiT is a guard interval length and Ki is a number of carrier waves of an i-th data transmission symbol in said OFDM transmission frame;

arbitrarily selecting values of Ni, Mi and Ki;

determining a ratio Ki/NiT which is smaller than a constant value W, W being a positive real number, determined by a bandwidth of a transmission channel of said transmission system; and ordering said data transmitting symbols so that said data transmitting symbols are transmitted in such an order that the data transmitting symbols having an identical effective symbol length and a guard interval length are continuously arranged on the time base and a number of switching points where two adjacent data transmitting symbols having at least mutually different effective symbol lengths or mutually different guard interval lengths are located is minimized.

9. A method for transmitting data in an orthogonal frequency division multiplexing (OFDM) transmission system, comprising:

transmitting at least one OFDM transmission frame defined by T, positive integers Ni and Ki, and zero or positive integer Mi, wherein T is a time interval of OFDM sampling points, NiT is an effective symbol length, MiT is a guard interval length and Ki is a number of carrier waves of an i-th data transmission symbol in said OFDM transmission frame;

arbitrarily selecting values of Ni, Mi and Ki;

determining a ratio Ki/NiT which is smaller than a constant value W, W being a positive real number, determined by a bandwidth of a transmission channel of said OFDM transmission system; and ordering said data transmitting symbols such that said OFDM transmission frames include data transmitting symbols having a relatively long effective symbol length and a relatively long guard interval length for fixed reception, and said OFDM transmission frames include data transmitting symbols having a relatively short effective symbol length and a relatively short guard interval length for mobile reception.

10. A method for transmitting data in an orthogonal frequency division multiplexing (OFDM) transmission system, comprising:

transmitting at least one OFDM transmission frame defined by T, positive integers Ni and Ki and zero or positive integer Mi, wherein T is a time interval of OFDM sampling points, NiT is an effective symbol length, MiT is a guard interval length and Ki is a number of carrier waves of an i-th data transmission symbol in said OFDM transmission frame;

arbitrarily selecting values of Ni, Mi and Ki;

determining a ratio Ki/NiT which is smaller than a constant value W, W being a positive real number, determined by a bandwidth of a transmission channel of said OFDM transmission system;

transmitting at least part of the data of a specific data transmitting symbol in an OFDM transmission frame, where an effective symbol length NaT, Na being a positive integer, a guard interval length MaT, Ma being zero or a positive integer, and a number of carrier waves Ka, Ka being a positive integer, of said specific data transmitting symbol are known by the receiver along with the modulation techniques selected for the carrier waves of the specific symbol, so that at least part of the data on the effective symbol lengths, the guard interval lengths, the number of carrier waves and the modulation techniques selected for the respective carrier waves of all the data transmitting symbols other than said specific data transmitting symbol in said specific OFDM transmission frame are transmitted from a transmitter to a receiver by said specific symbol; and modifying at least one of said effective symbol length, said guard interval length, said number of carrier waves and said modulation techniques for each OFDM transmission frame by a specific data transmitting symbol on an OFDM transmission frame basis.

* * * * *